United States Patent [19]

Sato et al.

[11] 4,416,863

[45] Nov. 22, 1983

[54] METHOD FOR SYNTHESIZING AMORPHOUS SILICON NITRIDE

[75] Inventors: Kimihiko Sato, Yokohama; Kunihiko Terase, Tokyo; Hitoshi Kijimuta, Ebina; Yukinori Ohta, Yokohama, all of Japan

[73] Assignee: Asahi Glass Company Ltd., Tokyo, Japan

[21] Appl. No.: 394,862

[22] Filed: Jul. 2, 1982

[30] Foreign Application Priority Data

Jul. 21, 1981 [JP] Japan ............................. 56-112971

[51] Int. Cl.³ ...................... C01B 21/06; B01D 59/08
[52] U.S. Cl. ......................................... 423/344; 55/82
[58] Field of Search ............... 423/344, 406, 409, 470, 423/471, 215.5; 55/82

[56] References Cited

U.S. PATENT DOCUMENTS

| | | | |
|---|---|---|---|
| 2,675,889 | 4/1954 | Frey | 55/82 |
| 3,959,446 | 5/1976 | Mazdiyasni et al. | 423/344 |
| 3,979,500 | 9/1976 | Sheppard et al. | 423/344 X |
| 4,196,178 | 4/1980 | Iwai et al. | 423/344 X |

Primary Examiner—Edward J. Meros
Assistant Examiner—Steven Capella
Attorney, Agent, or Firm—Oblon, Fisher, Spivak, McClelland & Maier

[57] ABSTRACT

A method for synthesizing amorphous silicon nitride, wherein silicon halide and ammonia are reacted in a reaction vessel at a high temperature in the absence of oxygen to thereby synthesize powder of amorphous silicon nitride, then the powder is separated from a gas containing therein gaseous ammonia halide which has been produced simultaneously with said amorphous silicon nitride by use of a collecting means, comprises directly mixing, in advance of the separation, cool gas containing therein neither oxygen nor moisture into said gas to cool down said powder and gas so that both substances may be put in said collecting means without deposition of ammonium halide to the inner wall of the reaction vessel, and other component parts.

2 Claims, 1 Drawing Figure

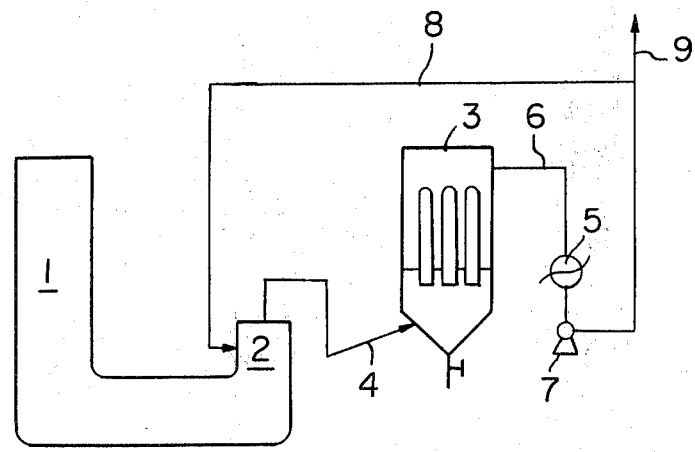

METHOD FOR SYNTHESIZING AMORPHOUS SILICON NITRIDE

BACKGROUND OF THE INVENTION

1. Field of the Invention

This invention relates to a method for synthesizing amorphous silicon nitride. More particularly, it is concerned with a method for efficiency synthesizing and recovering amorphous silicon nitride by a gas-phase reaction of silicon halide and ammonia.

2. Description of the Prior Arts

Sintered bodies of silicon nitride and silicon carbide have recently drawn attention from every field of technology as useful heat-resistant materials for various purposes. The materials are also widening their uses owing to the high corrosion-resistant property they possess.

Of these uses, the materials are regarded as particularly useful for gas turbine blades, radiant tubes in high temperature furnaces, and so forth owing to their exhibiting excellent property.

There have so far been proposed various methods for producing silicon nitride, of which the gas-phase reaction between silicon tetrachloride ($SiCl_4$) and ammonia is the most popular method. This method is to subject silicon tetrachloride and ammonia, in required quantities, to the gas-phase reaction at a temperature range of from 590° C. to 1500° C. in the absence of oxygen to thereby synthesize α-crystal of silicon nitride in a single stage reaction, after which the synthesized product is immediately used for a raw material for the sintered body.

However, according to the studies made by the present inventors, it has been found out that this synthesizing method by the single stage reaction is low in its conversion rate of the reactants to silicon nitride in α-crystal which is considered favorable as the raw material for sintering, and moreover contains a considerable amount of amorphous silicon nitride mixed therein, which hinders the sintering property of the synthesized product.

In view of such problem inherent in the heretofore known method of synthesis of amorphous silicon nitride, the present inventors have found out that silicon nitride in α-crystal having favorable sintering property can be obtained at a high rate of yield by dividing the synthesizing reaction into two stages, wherein silicon tetrachloride and ammonia at a specified ratio are reacted at the first stage for a specified time and at a specified temperature to thereby positively synthesizing amorphous silicon nitride, and then said amorphous silicon nitride is maintained at the second stage in a current of nitrogen or ammonia for a specified time and at a specified temperature. On the basis of this finding, they have filed a patent application in Japan under Patent Application No. 53-41712.

According to this proposed method, powder of amorphous silicon nitride is produced in a body of a high temperature gas at the first stage reaction. The gas is hydrogen chloride as the principal constituent, in addition to which gaseous ammonium chloride is contained in a relatively large quantity. Such nitride powder is then separated and collected from the reaction product gas for the necessity of changing the reaction atmosphere for providing the same at the second stage reaction.

For such collecting expedient, there may be used various types of collecting devices, of which a bag filter type collector, an electric precipitator, and like other collectors are particularly favorable from the standpoints of device construction and collecting efficiency, in view of particle diameter of the produced powder being very fine.

Incidentally, most of the collectors which are generally used would be quite unsuitable because such collectors when exposed to a high temperature corrosive gas in the treatment system as in the present invention, would simply not withstand such conditions and would be undurable.

In such a case, it is a usual practice to cool the treatment system from outside of the device. However, when the external cooling is effected in this treatment system, ammonium chloride deposits and adheres onto the inner wall of the device with the consequent trouble of clogging the device interior.

In view of such point of problem, the present inventors have conducted various researches and studies for any expedient that can perform effective cooling, as the result of which they have found out that, when cool gas is directly mixed into the body of a high temperature gas containing therein amorphous silicon nitride powder and gaseous ammonium chloride, the ammonium chloride as deposited does not substantially adhere onto the inner wall of the device, and yet the system as a whole can be effectively cooled, whereby collection of amorphous silicon nitride powder can be done through a filter smoothly and over a long period of time.

SUMMARY OF THE INVENTION

It is therefore a primary object of the present invention to provide an improved method for synthesizing amorphous silicon nitride free from all the disadvantages inherent in the conventional technique of synthesis.

It is another object of the present invention to provide an improved method for synthesizing amorphous silicon nitride substantially free from sticking of ammonium chloride deposited as by-product onto the inner wall surface of the reacting device.

According to the present invention, in general aspect thereof, there is provided a method for synthesizing amorphous silicon nitride, wherein silicon halide and ammonia are reacted in a reaction vessel at a high temperature in the absence of oxygen to thereby synthesize powder of amorphous silicon nitride, then the powder of silicon nitride is separated from a gas containing therein gaseous ammonia halide which has produced simultaneously with said amorphous silicon nitride by use of a collecting means, characterized by the step of directly mixing, in advance of the separation, cool gas containing therein neither oxygen nor moisture into said gas to cool down said powder and gas so that both substances may be put in said collecting means without causing ammonium halide to be deposited to substantially adhere onto the inner wall of the reaction vessel, and other component parts.

There has thus been outlined, rather broadly, the more important feature of the present invention in order that the desired description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent construction so far as they do not depart from the spirit and scope of the present invention.

BRIEF DESCRIPTION OF THE DRAWING

Specific embodiment of the present invention has been chosen for the purpose of illustration and description, and are shown in the accompanying drawing, forming a part of the specification, in which a single FIGURE is a schematic flow chart showing the synthesizing method of amorphous silicon nitride according to a preferred embodiment of the present invention.

DETAILED DESCRIPTION OF THE PREFERRED EMBODIMENTS

In the following, the present invention will be described in detail in various aspects thereof.

In the present invention, the cool gas to be directly mixed into the body of high temperature gas should preferably be an inactive gas such as nitrogen, argon, etc., those gases which convert the amorphous silicon nitride as produced into an oxide such as, for example, oxygen-containing gas like air, etc. or moisture-containing gas being not suitable. However, when a gas is mixed into the gas body from outside, the total quantity of the gas increases for the quantity as mixed in, hence the device itself becomes large in size, and a power for driving the same is required to be high for the increase in size.

Therefore, in the present invention, it is preferred to adpot the following expedient. That is to say, a gas body, which has been cooled to such a degree that does not hinder the operation of the collector, is put in the collector along with amorphous silicon nitride powder and ammonium chloride powder which has been deposited by cooling to collect both powder materials, and the gas body remaining after the powder collection is taken out of the collector and cooled down further to a lower temperature level through an appropriate heat-exchanger. This cooling temperature is at such a level that is able to cool down a high temperature gas prior to its feeding into the collector to a degree that enables the same to be fed into the collector. Moreover, the gas in a quantity which has been newly generated by the reaction is purged outside, and is cooled down to a temperature which prevents ammonium chloride from being deposited at this stage in a substantially perfect condition by cooling of the high temperature gas prior to its feeding into the collector so that no ammonium chloride may be deposited further by the cooling in the above-mentioned heat-exchanger.

Thus, during a normal operating time, no cooling gas needs to be particularly brought into the system from outside. Moreover, since the composition of the gas used for the cooling is only that as primarily contained in the reaction system, there is no possibility of any inconvenience to take place.

The raw material for the synthesis according to the present invention may be selected, besides silicon tetrachloride, from $SiHCl_3$, $SiH_2Cl_2$, $SiH_2Cl$, $SiCl_4$, etc. of which $SiCl_4$ and $SiHCl_3$ are particularly preferred because of their reactivity, easiness in handling, etc. Further, depending on necessity, other silicon halides such as $SiBr_4$, $SiHBr_3$, $SiH_2Br_2$, $SiH_3Br$, $SiI_4$, $SiHI_3$, $SiH_2I_2$, $SiH_3I$, $SiCl_2Br_2$, $SiCl_2I_2$, etc. may also be employed. Some of these materials are in a gaseous state at a normal temperature, and others are in a liquid or solid state. With a view to conducting a uniform and quick reaction, it is preferable that these materials in the liquid or solid state be gassified by means of, for example, appropriate indirect heating, etc. so as to be adapted for the reaction with ammonia.

The reaction between these raw materials and ammonia should preferably be such that ammonium halide as a by-product be as small as possible. For this purpose, the quantity of ammonia to be used for the reaction should appropriately be from 0.1 to 5 in terms of the molar ratio with respect to halogen-containing inorganic silicon compound for use as the raw material.

When the quantity of ammonia for use is lower than the abovementioned range, the rate of production of silicon nitride is low. On the contrary, when the quantity exceeds the above-mentioned range, the mixing quantity of ammonium halide powder into silicon nitride powder increases. Both these situations are not favorable from the industrial standpoint of view.

Of the above-mentioned range, when the molar ratio of a range of from 0.5 to 3 is adopted, there can be advantageously obtained in an industrial scale silicon nitride powder with less mixing quantity of ammonium halide, which is particularly preferable.

The reaction temperature to be adopted should appropriately be in a range of from 400° to 1600° C. When the temperature is lower than 400° C., the reaction does not proceed satisfactorily with a low production ratio of silicon nitride. On the other hand, when the temperature exceeds 1600° C., not only immense amount of energy is required, but also the material for constructing the device, which should be durable against a high temperature condition and an atmosphere of halides, is limited, which is disadvantageous, hence not preferable from the industrial standpoint.

The reaction time to be adopted should appropriately range from 30 to 0.1 second. When the reaction time exceeds 30 seconds, the reaction device becomes unnecessarily large in scale to invite industrial disadvantage. On the other hand, when the time does not reach 0.1 second, there exists such possibility that the reaction does not proceed substantially, which is therefore not preferable.

Of the above-mentioned reaction temperature and time, when the reaction temperature of from 500° C. to 1550° C. and the reaction time of from 20 to 0.5 second are adopted, amorphous silicon nitride can be obtained effectively and industrially advantageously by the reaction between silicon halide and ammonia, which conditions are therefore particularly preferable.

Incidentally, the relationship between the reaction temperature and time is such that, in the above-described respective ranges, as the reaction temperature becomes higher, the reaction time becomes shorter.

The thus obtained gas containing therein amorphous silicon nitride powder, gaseous ammonium halide, and so forth is cooled, and each and every component is separated by the collector in accordance with the process of the present invention.

There is no particular limitation to the kind of the collector for use in the present invention. That is to say, charge layer type and bag filter type collectors, electric collectors, cyclons, and so on, for example, can be used arbitrarily as the case may be. Materials used for these collecting devices have disadvantages in that they would reduce their heat-resistant property and corrosion-resistant property in one part of the filter and the electrodes when a gas at a temperature higher than 200° C. to 300° C. is caused to pass through the collectors. Moreover, when the gas contains hydrogen halide gas, there occurs corrosion and other possible inconveniences in the component parts of the device.

As a matter of fact, the gas as taken out of the reaction system is at a temperature range of from 500° C. to 1550° C. or so, at which temperature level the product cannot be passed through the collector as it is, hence the gas is necessary to be cooled by the above-mentioned expedient.

With a view to enabling those persons skilled in the art to reduce the present invention into practice, a preferred embodiment thereof will be explained hereinbelow in reference to the accompanying drawing.

Referring to the single FIGURE of drawing, a reference numeral 1 designates a reaction vessel to carry out the gas-phase reaction between silicon halide and ammonia, and a reference numeral 2 denotes an outlet for silicon nitride powder and gas produced by the reaction. A numeral 3 refers to a separating device such as a bag filter, etc. for separating the powder and the gas, the device being communicatively connected with the above-mentioned outlet 2 of the reaction vessel 1 by a tubing 4. A numeral 5 refers to a heat-exchanger for further cooling of the gas which has been separated by the separating device 3, and a numeral 6 designates a tubing for connecting the separator and the heat-exchanger. A numeral 7 refers to a blower for blowing cooling gas into the above-mentioned outlet 2 for the reaction vessel 1 through a tubing 8. A reference numeral 9 designates a gas purging tube provided on the half way of the tubing 8, through which a quantity of gas substantially corresponding to the gas generated by the reaction is purged out. Since the purged gas contains therein noxious gases such as hydrogen halide, etc., it is led to a denuding tower for cleaning.

The amorphous silicon nitride powder containing therein ammonium halide and which has been separated by the collecting device is subjected to heat-treatment in a stream of nitrogen or ammonia in a state of air being shut off, whereupon silicon nitride in the alpha-crystal can be readily obtained. When the silicon nitride powder is reacted with carbon in nitrogen or ammonia, there is obtained silicon carbide. Since this silicon carbide is obtained in the form of a very fine powder, it has desirable sintering property. Details of the synthesizing method for such silicon nitride and silicon carbide are described in Japanese patent application Nos. 53-41712 and No. 55-106758, respectively, hence reference may be had to these applications as laid open to public inspection.

In the following, a couple of operable examples of the present invention are presented.

EXAMPLE 1

There was provided a treatment device comprising a reaction vessel consisting of an empty tower reaction chamber having a volume of 0.25 m$^3$(0.5 m$\emptyset \times$ 1 m) made of a heat-resistant and acid-resistant material, and having an electric heater; a bag filter having polytetrafluoroethylene filter cloth (with air permeating quantity of 12.6 cc/cm$^2$/sec.) having a filtering area of 9 m$^2$; a heat-exchanger for gas cooling (heat transmission area of 4.4 m$^2$); a circulating blower (250 Nm$^3$/hr.); and tubing.

While flowing nitrogen gas in the reaction device, the temperature of the reaction vessel was raised. On the other hand, the blowing quantity of the cool gas was adjusted in such a manner that a temperature of a cool gas mixing and gas mixing part at the outlet of the reactor may be maintained at 300° C. or below, and a gas temperature at an inlet of the bag filter may be maintained at 150° C. or below, thereby maintaining the temperature in the reaction vessel at 1000° C.

Subsequently, 18.3 kg/hr. of SiCl$_4$, 2.89 Nm$^2$/hr. of NH$_3$ ((NH$_3$/SiCl$_4$=1.2 by molar ratio) and 4.74 Nm$^2$/hr. of diluting N$_2$, all being as the raw materials for the synthesis, were supplied from the top part of the reaction vessel through a double-tube nozzle (SiCl$_4$ and N$_2$ through the inner tube, and NH$_3$ and N$_2$ through the outer tube) for the intended reaction.

In a normal condition, when the reaction temperature was 990° C. and the blowing quantity of circulating cool gas at 40° C. was 165 Nm$^3$/hr., the gas temperatures at the cool gas mixing and gas mixing part at the oulet of the reaction vessel and at the inlet of the bag filter were respectively 130° C. and 125° C., the powder concentration in the gas at the inlet port of the bag filter was 30 g/Nm$^3$, and the gas quantity purged out of the reaction system was 13.6 Nm$^3$/hr., whereby continuous reaction operations for 24 hours could be achieved.

After the experiment, the cool gas mixing and gas mixing part, the tubings, and the bag filter were inspected. It was found out that the powder of amorphous silicon nitride slightly adhered onto the inner wall of the devices, no deposition of ammonium chloride to the inner wall of the devices was observed.

EXAMPLE 2

The experiment was conducted in the same procedures and using the same reaction device as in Example 1 above.

The temperature in the reaction vessel was maintained at 1100° C., into which 18.2 kg/hr. of SiCl$_4$, 4.82 Nm$^3$/hr. of NH$_3$ (NH$_3$/SiCl$_4$=2 by molar ratio), and 4.74 Nm$^3$/hr. of diluting N$_2$ were supplied for the intended reaction.

In a normal condition, when the reaction temperature was 1085° C., the blowing quantity of circulating cool gas at 45° C. was 185 Nm$^3$/hr., the gas temperatures at the cool gas mixing and gas mixing part at the outlet of the reaction vessel, and at the inlet of the bag filter were respectively 146° C. and 140° C., the powder concentration in the gas at the inlet of the bag filter was 44 g/Nm$^3$, and the quantity of the gas purged out of the reaction system was 12.8 Nm$^3$/hr., whereby the continuous reaction operations for 20 hours could be achieved without any trouble whatsoever.

After completion of the experiment, the reaction device was inspected, as the result of which no deposition of ammonium chloride to the inner wall of the device was observed.

We claim:

1. A two stage method for synthesizing amorphous silicon nitride, comprising reacting in the first stage silicon halide and ammonia in a reaction vessel for about 0.1 to 3 seconds at a temperature range of about 400° C. to 1600° C. in a molar ratio of ammonia to silicon halide of about 0.1 to 5 in the absence of oxygen to produce amorphous silicon nitride, and then separating in the second stage silicon nitride with ammonia halide which was produced in the first stage simultaneously with said amorphous silicon nitride, using a separating device wherein cool gas at a temperature of 150° C. or below containing therein neither oxygen nor moisture is introduced resulting in the collection of solid amorphous silicon nitride and condensed ammonium chloride without adhering into the separating device and other component parts thereof in any substantial amount.

2. The method as set forth in claim 1, wherein said cool gas is further cooled by a heat-exchanger for recycling.

* * * * *